Oct. 5, 1926.
F. H. VAN HOUTEN
1,601,781
PROCESS OF HANDLING DOUGH
Filed June 28, 1922
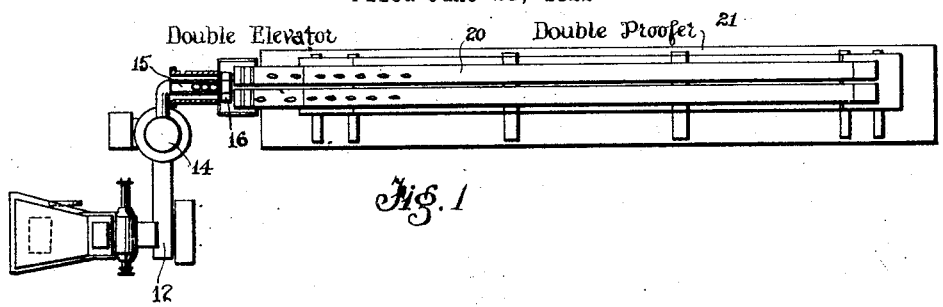
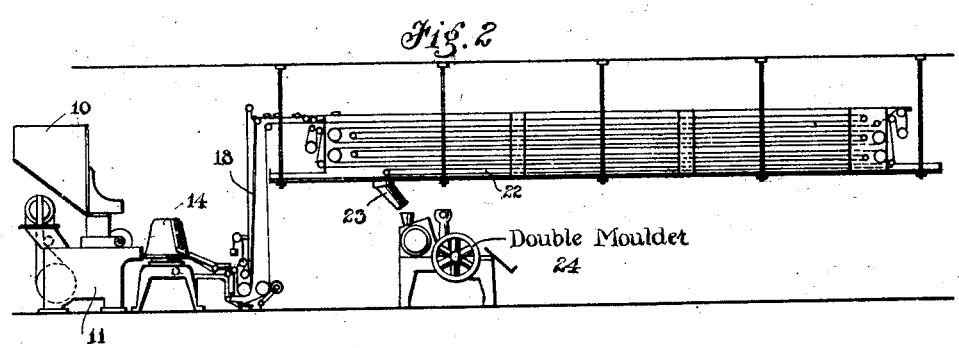
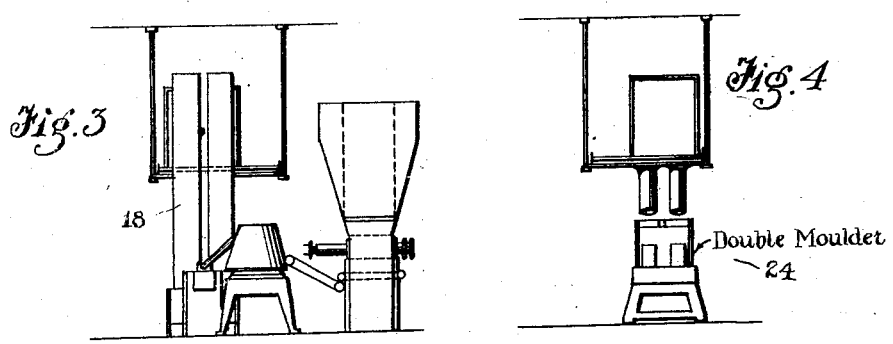
Inventor
F. H. Van Houten
By Church & Church
Attorneys Patented Oct. 5, 1926.

1,601,781

UNITED STATES PATENT OFFICE.

FRANK H. VAN HOUTEN, OF BEACON, NEW YORK, ASSIGNOR TO DUTCHESS TOOL COMPANY, OF BEACON, NEW YORK, A CORPORATION OF NEW YORK.

PROCESS OF HANDLING DOUGH.

Application filed June 28, 1922. Serial No. 571,529.

This invention relates to a process of handling dough preparatory to baking loaves of bread. The object of the present invention is to devise a process that will produce a finer quality in the grain of the finished loaf of bread.

In handling dough in large quantities I have found that the dividing and rounding machines at present in use in the trade can be most effectively run at a speed too rapid for efficient operation of the molding machine, rapidity of handling of the dough balls through the molding machine being deterimental to the grain and texture of the finished loaf and I have found that by considerably reducing the speed of handling the dough balls in the molder that a very much finer quality of loaf may be obtained.

By feeding the pieces of dough from the divider through the rounder and proofer at the rate of say from eighty to ninety pieces per minute and by reducing this rate of feeding to just one-half in its final finishing operation, that of molding ready for the pans, a greatly improved quality of finished loaf is obtained. It is of course obvious that after realizing the improvement of slow molding that the molder could be set to operate at its most efficient speed and the divider and rounder could then be slowed down to this speed, but this would result in a very great loss of efficiency of the plant as a whole.

In the present process the dough is passed to the dividing machine at the most efficient speed of the latter and after the dough passes through the rounding machine which operates at the same speed as the divider the single line of balls of dough is divided into two lines or columns and these two columns of dough balls are carried up a double elevator and deposited in two lines or columns on the top belt of the proofer from which the balls ultimately drop into the double molder.

In the drawings,—

Figure 1 is a plan view of a device for carrying out the present invention.

Fig. 2 is a side elevation thereof.

Fig. 3 is an end view.

Fig. 4 is an end elevation of the double molder and proofer.

The dough is fed to the hopper 10 of the divider 11 which operates in the usual manner discharging to a belt or trough 12 leading to the rounder 14. The rounding machine delivers to an inclined chute 15 having a separator 16 of any of the well known types which delivers the balls alternately to the left and to the right discharging to the double elevator structure 18, each elevator delivering the balls of dough in properly spaced relation to the top belt 20 of the double proofer 21. It is obvious that the top belt 20 may consist of a single wide reach but is preferably of two separate belts as most clearly shown in Figure 1. The lowest reach 22 of the proofer discharges to two troughs 23 which directs the proofed balls of dough to a double molder 24, each of the two molding machines receiving the balls of a single column.

By means of the mechanism described I am able to run the divider and rounder at their most efficient speeds and by having the proofer double as shown, the cabinet may be but half the length of one where the pieces are run through in a single line. I do not claim novelty for the passing of the balls of dough through the proofer in parallel columns as this is well known in the art but as far as I am aware it has never been appreciated that a pair of mold machines could be run at maximum efficiency and be fed by a divider and rounder each likewise running at maximum efficiency.

What I claim is:

1. The process of improving the grain of the finished loaf of bread which consists in passing dough to a divider, passing the divided dough pieces thru a rounder in a single column, separating the column of dough balls into two simultaneously moving columns, and then passing the balls of one column to a molding machine, and passing the balls of the other column into a second molding machine the balls of dough passing through said molding machines at a comparatively low rate of speed to improve the grain of the resulting loaf.

2. The process of improving the grain of the finished loaf of bread which consists in passing dough to a divider running at from sixty to ninety pieces per minute, passing the balls of dough thru a rounding machine in a single line, passing the balls of dough thru the proofer in a double line, and in passing the balls of each line simultaneously through molders running at from thirty to forty-five pieces per minute, that is, at half the speed of the divider the rate of travel of the balls of dough through said molders being comparatively low to improve the grain of the resulting leaf.

3. The process of improving the grain of the finished loaf of bread which consists in passing dough to a divider, then to a rounder, then proofing the balls of dough and in finaly passing each alternate ball to a molder, and simultaneously passing the remaining balls to a second molder, said balls being passed through said molders at a low speed compared to the speed of the divider and rounder whereby the grain of the resulting loaf is greatly improved.

FRANK H. VAN HOUTEN.